(12) United States Patent
Halpern

(10) Patent No.: US 7,266,116 B2
(45) Date of Patent: Sep. 4, 2007

(54) HTTP EXTENSION HEADER FOR METERING INFORMATION

(75) Inventor: Joel M. Halpern, Washington, DC (US)

(73) Assignee: Skylead Assets Limited, Tortola (VG)

( * ) Notice: Subject to any disclaimer, the term of this patent is extended or adjusted under 35 U.S.C. 154(b) by 128 days.

(21) Appl. No.: 11/010,812

(22) Filed: Dec. 13, 2004

(65) Prior Publication Data

US 2006/0126809 A1 Jun. 15, 2006

(51) Int. Cl.
*H04M 12/66* (2006.01)
*G06F 15/16* (2006.01)

(52) U.S. Cl. ............... 370/352; 709/217; 709/219; 709/231; 455/408

(58) Field of Classification Search ........ 379/111, 379/112.01, 112.07–112.09, 114.01, 114.03, 379/144.05, 114.08, 114.11, 114.17–114.2, 379/115.01, 115.03, 121.01, 126; 455/405–408; 709/203, 217–219, 231–232; 370/352–355
See application file for complete search history.

(56) References Cited

U.S. PATENT DOCUMENTS

| | | | |
|---|---|---|---|
| 6,968,389 B1* | 11/2005 | Menditto et al. | 709/233 |
| 6,981,029 B1* | 12/2005 | Menditto et al. | 709/217 |
| 6,987,987 B1* | 1/2006 | Vacanti et al. | 455/556.2 |
| 2002/0032727 A1* | 3/2002 | Dias et al. | 709/203 |
| 2002/0038339 A1* | 3/2002 | Xu | 709/203 |
| 2002/0104022 A1* | 8/2002 | Jorgenson | 713/201 |
| 2002/0129137 A1* | 9/2002 | Mills et al. | 709/224 |
| 2002/0176378 A1* | 11/2002 | Hamilton et al. | 370/328 |
| 2003/0039234 A1 | 2/2003 | Sharma et al. | |
| 2004/0008629 A1* | 1/2004 | Rajagopal et al. | 370/239 |
| 2004/0088170 A1* | 5/2004 | Nakanishi et al. | 705/1 |
| 2004/0088183 A1* | 5/2004 | Nakanishi et al. | 705/1 |
| 2004/0103192 A1* | 5/2004 | Yli-Korhonen et al. | 709/224 |
| 2004/0107109 A1* | 6/2004 | Nakanishi et al. | 705/1 |
| 2004/0111364 A1* | 6/2004 | Haakana | 705/39 |
| 2005/0135264 A1* | 6/2005 | Popoff et al. | 370/252 |
| 2005/0165665 A1* | 7/2005 | Koshinen et al. | 705/34 |
| 2005/0281194 A1* | 12/2005 | Sonoda | 370/220 |
| 2006/0008064 A1* | 1/2006 | Sangillo | 379/114.08 |
| 2006/0085846 A1* | 4/2006 | Uno et al. | 726/6 |
| 2006/0114832 A1* | 6/2006 | Hamilton et al. | 370/244 |
| 2006/0168147 A1* | 7/2006 | Inoue et al. | 709/219 |

\* cited by examiner

*Primary Examiner*—Binh K. Tieu
(74) *Attorney, Agent, or Firm*—Schwabe, Williamson & Wyatt, P.C.

(57) ABSTRACT

A packet inspection system is provided with data inspection logic for inspecting subscriber packet traffic. The system includes a pre-rating classification table associated with the data inspection logic. The pre-rating classification table includes a table having one or more entry for static or slowly changing rating aspects of traffic applications and/or one or more entries identifying a dynamic changing rating aspects of a traffic application. A server with a rating engine is also provided. The data inspection logic makes a query to the pre-rating table as to the treatment of rating aspects of traffic applications and either obtains a rate value from the pre-rating classification table from one of the table entries for static or slowly changing rating aspects of traffic applications or obtains an indication from the one or more entry identifying a dynamic changing rating aspects of traffic applications directing the data inspection logic to query the rating engine, the data inspection logic then querying the server as to dynamic changing rating aspects of traffic applications and the server providing the data inspection logic with a correct valuation for the dynamic changing rating aspects of traffic applications.

18 Claims, 3 Drawing Sheets

HTTP EXTENSION HEADER FOR METERING INFORMATION

FIELD OF THE INVENTION

The invention relates generally to metering or charging for data transfer including data transferred using a protocol such as the HyperText Transfer Protocol (HTTP). In particular, the invention is applicable to billing procedures for subscriber traffic processing and real-time rating and decrementation of a stored value for services, billing systems for telecommunications relating to applications including prepaid voice and data services for GSM (Global System for Mobile communications)/GPRS (General Packet Radio Services), CDMA (Code Division Multiple Access)/1xRTT and 3G wireless carriers, Wi Fi (Wireless fidelity), DSL (Digital Subscriber Line), multimedia messaging services (MMS), mobile content and Internet access, VoIP (Voice over Internet Protocol) calls and other stored value transactions.

BACKGROUND OF THE INVENTION

The procedure in which telecommunication data inspection systems determine what the provider has previously decided something should cost for applications is generally referred to as rating. The applications may include prepaid voice and data services for GSM/GPRS, CDMA/1xRTT and 3G wireless carriers, Wi Fi, and MMS services, mobile content and Internet access, VOIP calls and other stored value transactions.

When providing charging oriented traffic classification and metering (for both pre and post paid subscribers), there are times when the subscribers access content (downloadable ring-tones, video clips, applications) where the value is best known by the content server which provides this content. Even with a powerful rating engine, it is difficult and time consuming for the operator to internally provide the correct valuation of the content.

Using statically defined rating tables administered by the operator limits the degree to which content providers (and operators) can benefit from dynamic factors, such as promotions that relate to popular events. Such static definitions also limit the extent to which incentives can be delivered to customers in real-time, affording a benefit, for example, at the time the customer is a specific application or downloading specific content, that is be derived from the knowledge that there is a correlation between the popularity of that application and another application or service.

Content providers and operators often want to apply discounts and incentives to subscribers (e.g., free game after so many played, two-for-one ring tone downloads on a particular day, etc.). Such incentive structures are highly dynamic and difficult to pre-program in operator rating engines.

Innovative content providers are often, by nature, highly streamlined organizations. Systems that require such organizations to institute complex micropayment schemes can prevent mobile operators, and their subscribers, from benefiting to the maximum extent from the availability of new and potentially compelling content, and from the dynamic and highly innovative pricing and incentive plans that such organizations typically institute.

SUMMARY OF THE INVENTION

It is an object of the invention to provide a system and method that allows the content source to indicate the content valuation to be applied. The content source is typically a content server run by either another business entity within the operator business or run by a business partner. It is another object of the invention to provide a system that is easily implemented by a trusted content provider, such that no significant investment is required on the part of the content creator. Such a system should be able to permit highly dynamic pricing schemes and should be able to allow for promotions and incentives that are dynamic in nature, based on highly stateful data, including time of day and day of week, roaming network identity, application requested, content partner identity, specific content requested, historical information regarding usage, credit or balance status, subscription status, and other factors.

According to the invention, a subscriber delivery system is provided with data inspection logic for inspecting subscriber packet traffic and for inspecting control traffic associated with stateful applications such as video streaming and push to talk over cellular (PoC). The subscriber delivery system includes metering data associated with the data inspection logic. The data inspection logic receives and inspects subscriber control and data requests to determine whether a request relates to a source or source content specified in the metering data. If the subscriber's request relates to a source or source content specified in the metering data, the metering data indicates that the content source may send metering information, the subscriber's request passes through the data inspection logic to the content source and the data inspection logic defers metering until a response is received.

The subscriber delivery system may be connected to a content source for replying to the subscriber's request including providing metering information in the reply. The data inspection logic may receive the reply and apply appropriate charging to a subscriber's account based on the metering information. The logic may receive the reply and use it to implement a dynamic detection point, whereby control over the subscriber session is transferred to the adjacent intelligent networking (IN) or prepaid environment, allowing for this IN system to return authorization with a permit/deny, or return a specific value for the content. In this case the reply is used to flag the fact that dynamic rating is required, as opposed to specifically detailing the rate.

The system inspection logic may also include a plurality of processing blades of a chassis, wherein each processing blade may be connected to a switch that is connected to a router via a connection such as gigabit Ethernet connection.

The subscriber delivery system may further include metering category data associated with the data inspection logic. Each of the metering category data may have associated charging information, and the metering information may include a name of a metering category. The metering information may also include information providing an indication of the amount to be charged to the subscriber's account. Further, the metering information may comprise information providing an indication that the subscriber's account is to be charged based on metering data already associated with the data inspection logic.

The subscriber delivery system may further comprise metering category data associated with the data inspection logic. Each of the metering category data may have associated charging information. The metering information may include a name of a metering category or a new or replacement metering category and provide an indication that the subscriber's account is to be charged based on a metering category already associated with the data inspection logic or based on a metering category newly associated with the data inspection logic. The metering information may be provided in a HTTP header of a response message to the subscriber and the data inspection logic may inspect at least the HTTP header of the response message.

The content source of the subscriber delivery system may include HTTP logic means for adding an HTTP extension header as part of the HTTP header of the response message.

The metering information of the subscriber delivery system may be provided in a body of a response message to the subscriber and the data inspection logic parses the body of the response message. The response message may be a Multimedia Messaging Services (MMS) message. The metering information may include a content value class for postpaid subscribers and/or a credit amount for prepaid subscribers applicable to the content to be transferred.

The subscriber delivery system may apply appropriate charging to the subscriber's account based on a content value class for postpaid subscribers and/or a credit amount for prepaid subscribers applicable to the content to be transferred. The system may generate Call Detail Records (CDRs) for auditing and settling up with the business partner.

The metering data may include one or more URI sets comprising collections of patterns which can match URIs used in the subscriber's request. The content source may have an associated URI that falls within one of the URI sets of the metering data has in advance agreed to provide metering information in the reply.

In the subscriber delivery system, a request for content of the content source sent by a subscriber may be directed through the delivery system and the inspection logic may hold or save data indicating the request as source specified metering until a response directed through the delivery system is received from the content source. Alternatively, when the subscriber sends a request for content of the content source, it may be directed through the delivery system and where the request relates to a source or source content specified in the metering data and the reply does not include metering information or where the request does not relate to a source or source content specified in the metering data, the inspection logic applies a normal metering policy. The normal metering policy may include pre-rating tables and pre-paid balance management protocols such as, RADIUS (Remote Authentication Dial in User Service), DIAMETER and Open Services Architecture (OSA)/PARLAY.

According to another aspect of the invention, a packet inspection system is provided with a subscriber delivery system including data inspection logic. The data inspection logic inspects subscriber packet traffic. Metering data is associated with the data inspection logic. The data inspection logic receives and inspects subscriber requests to determine if a request relates to a server or server content specified in the associated metering data. If a subscriber's request relates to a server or server content specified metering, the subscriber's request passes through the data inspection logic to the server and the data inspection logic defers metering until a response is received. A server's reply to the subscriber's request includes metering information. The data inspection logic receives the reply and based on the metering information applies appropriate charging to a subscriber's account. The reply could also contain a directive that results in a query from the packet inspection system. In this case the reply is effectively establishing a detection point in the system that results in querying of a specific subscriber database, rating engine, or other external system for the purposes of receiving an explicit permit/deny, or a specific rate for the traffic or application.

The data inspection logic may be formed by one or more processors connected to the subscriber traffic by one or more switches at a location with the one or more processors. The content server is at a remote location and may be connected to the one or more processors and switches via the router.

According to still another aspect of the invention, a method of metering subscriber data traffic is provided. The method includes receiving subscriber packet traffic which includes requests for content at a delivery system. Metering data is associated with the data inspection logic. The data inspection logic is used at the delivery system for inspecting the subscriber packet traffic including receiving and inspecting subscriber requests to determine if a request relates to server specified metering or not. If the subscriber's request relates to server specified metering, the request passes through the data inspection logic and the data inspection logic defers metering until a response is received. A content server may be used to provide a reply to the subscriber's request that includes metering information. The reply is sent to the delivery system. The reply is received at the delivery system. The inspection logic is used to determine if the reply can be passed to the subscriber based on the metering information and if so, the appropriate charging to a subscriber's account based on the metering information. The inspection logic may also be used to determine if the reply indicates that an additional query of northbound business support systems (including subscriber databases or prepaid systems) is required prior to passing the content to the subscriber. This additional query could be used to debit provided promotions, detail dynamic rating, etc, and signals, for example, that this content is now rated premium content as opposed to volume-based metered content.

The content server may include HTTP logic means for adding an HTTP extension header as part of the HTTP header of the response message including an extension header providing an additional line as part of the HTTP header including the metering information. Specifically, this invention is aimed at hypertext transfer protocol (HTTP) controlled content access. The content server provides in the HTTP extension header (an additional line as part of the HTTP header) of the relevant message towards the subscriber the content value class (for postpaid) and/or the credit amount (for prepaid) applicable to the content to be transferred. This permits the system to apply appropriate charging to the subscribers account, and to generate the relevant CDRs for auditing and settling up with the business partner. This also permits the system to institute a dynamic detection point based for querying of a northbound system (subscriber database, rating system, etc.) at the operator. The Hypertext Transfer Protocol (HTTP) is an application-level protocol for distributed, collaborative, hypermedia information systems. It is a generic, stateless, protocol which can be used for many tasks beyond its use for hypertext, such as distributed object management systems, through extension of its request methods, error codes and headers. A feature of HTTP is the typing and negotiation of data representation, allowing systems to be built independently of the data being transferred. HTTP has been in use by the World-Wide Web global information initiative since 1990. The first version of HTTP, referred to as HTTP/0.9, was a simple protocol for raw data transfer across the Internet. HTTP/1.0, as defined by Request for Comment document 1045 (RFC 1945), improved the protocol by allowing messages to be in the format of MIME-like messages, containing meta information about the data transferred and modifiers on the request/ response semantics. However, HTTP/1.0 does not sufficiently take into consideration the effects of hierarchical proxies, caching, the need for persistent connections, or virtual hosts. In addition, the proliferation of incompletely-implemented applications calling themselves "HTTP/1.0" has necessitated a protocol version change in order for two communicating applications to determine each other's true capabilities. The RFC 2616 specification defines the protocol referred to as "HTTP/1.1". This protocol includes more stringent requirements than HTTP/1.0 in order to ensure reliable implementation of its features. Practical information systems require more functionality than simple retrieval, including search, front-end update, and annotation. HTTP allows an open-ended set of methods and headers that indicate the purpose of a request. It builds on the discipline of reference provided by the Uniform Resource Identifier (URI), as a location (URL) or name (URN), for indicating the resource to which a method is to be applied. Messages are passed in a format similar to that used by Internet mail as defined by the Multipurpose Internet Mail Extensions (MIME). HTTP is also used as a generic protocol for communication between user agents and proxies/gateways to other Internet systems, including those supported by the Simple Mail Transfer Protocol (SMTP), Network News Transfer Protocol (NNTP), File Transfer Protocol (FTP), Gopher, and Wide Area Information Service (WAIS) protocols. In this way, HTTP allows basic hypermedia access to resources available from diverse applications.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
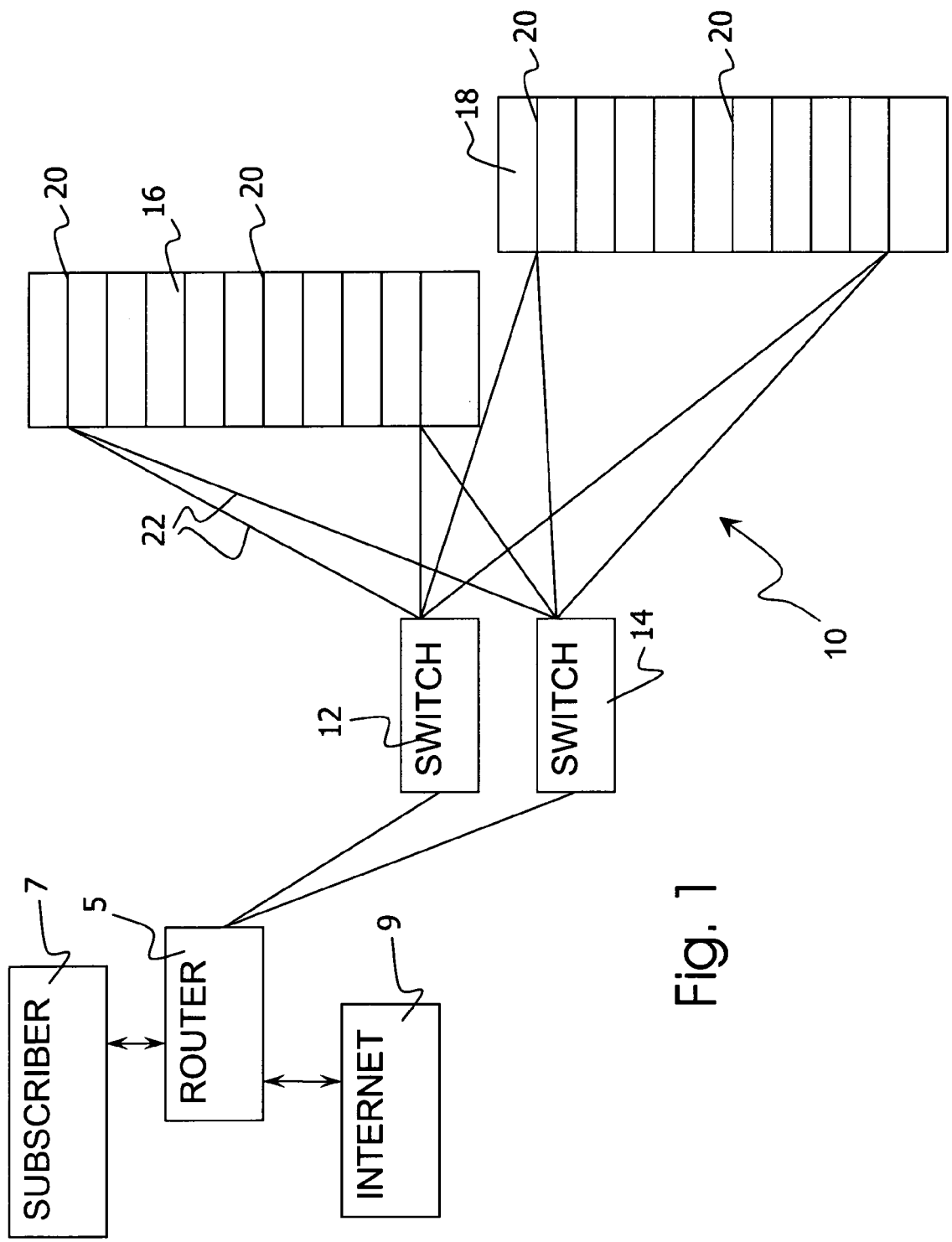
FIG. 1 is a schematic view of a Mobile Services Delivery System (MSDS) according to the invention.

Referring to the drawings in particular, the invention may be provided by a Mobile Services Delivery System (MSDS) 10 as shown in FIG. 1. The system 10 is connected to a router or switching device 5. The router 5 receives and sends packets to subscribers 7 and receives and sends packets to the Internet 9 or other sources of content. The router 5 directs packet traffic to the MSDS 10 via a switch 12 or via a set of switches 12 and 14. The switches 12 and 14 may be Ethernet switches (e.g., gigabit Ethernet). In the embodiment shown packets are inspected and/or processed with a system inspection logic 30 (see FIG. 2) using application processing engines provided by a plurality of processing blades 20 of a chassis 16. Each processing blade 20 is connected to each of the switches 12, 14 via gigabit Ethernet connections 22 or other similar connection. The preferred embodiment employs multiple Intel processor blades 20 in an Intel compact PCI chassis 16. In the embodiment of FIG. 1, a further chassis 18 is provided with further processor blades 20. Other and further processing capabilities may be provided as needed based on the particular processing situation encountered.

Figure 2:
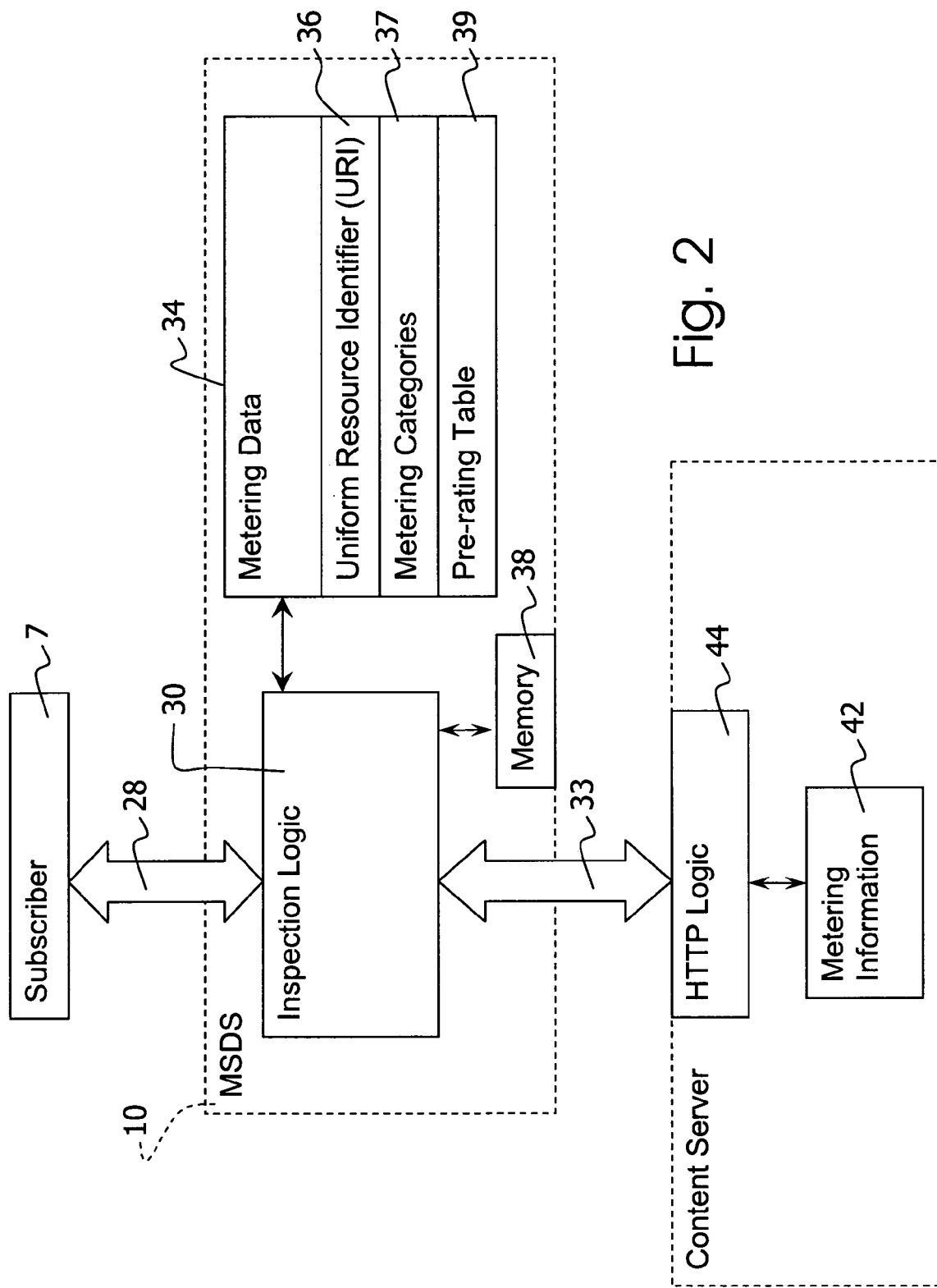
FIG. 2 is a schematic view of the delivery system with packet inspection and cooperating content server according to the invention.

FIG. 2 shows a logical embodiment of the MSDS 10 using the features of the invention. The MSDS 10 includes the system inspection logic 30. The system inspection logic 30 monitors subscriber traffic with the MSDS 10 acting as a single point for the creation and delivery of mobile data service policies including policies for access networks (roaming, home, 2.5G, 3G, WLAN), charging (postpaid, prepaid, content, event, promotion, time of day), and forwarding (content control, content or event limits). Operators can use the MSDS 10 to create dynamic policies based on the instantaneous subscriber state.

The system inspection logic 30 of MSDS 10 is provided with metering data 34. The system inspection logic 30 inspects packets of a subscriber traffic packet flow 28. The inspection of packets (indicated at 60 in FIG. 3) considers traffic applications of the subscriber traffic packet flow 28 to determine a correct valuation for the traffic applications. The MSDS 10 includes the metering data 34 that is associated with system inspection logic 30.

The metering data 34 includes one or more Uniform Resource Identifier (URI) entry 36 comprising a collection of patterns which can match URIs used in the subscribers request. The URI entries 36 are provided in advance based on particular content servers. The metering data 34 also includes metering categories 37 and may include other metering data such as a pre-rating table 39.

In a typical inspection process, the system inspection logic 30 evaluates the traffic packet flow 28 to determine if a subscriber's request of the traffic packet flow 28 relates to a server or server content specified in the metering data 34. If the subscriber's request does not relate to a server specified in the metering data 34, the system inspection logic 30 applies a normal metering policy as indicated at 64 in FIG. 3 (as described in detail in a co-pending U.S. application Ser. No. 10/887,198, the contents of which are hereby incorporated by reference). Specifically, the system inspection logic 30 considers whether the subscriber's request, which is contained in a traffic packet flow, matches a URI entry 36 that is contained in the metering data 34. If the subscriber's request does not match a URI entry 36, that is indicated as server driven metering permitted by a metering information, the system inspection logic 30 applies any normal metering policy as indicated at 64 in FIG. 3. On the other hand, if the subscriber's request does match a URI entry 36 that is indicated as server driven metering permitted by a metering information (as indicated at 62 in FIG. 3), the system inspection logic 30 passes the subscriber's request through to the content specified server 40 and note that metering is to be deferred until a further response is received. This part of subscriber's request hence becomes part of the MSDS to content server traffic 33. The system inspection logic 30 also notes that the subscriber's request is server specified metering, by holding this state or saving the state in memory 38. The system inspection logic 30 defers a rating or metering of this content until a response is directed to the MSDS 10 by the content server 40.

Each content server 40 that provides metering information in a reply to the MSDS 10 has agreed in advance to provide the metering information. The metering information is held in suitable memory 42 of the content server 40. The metering information may comprise information providing an indication of the amount to be charged to the subscribers account for the reply. The metering information may also comprise a metering category corresponding to a metering category in metering categories 37 of the metering data 34 of the MSDS 10. The metering information sent by the server 40 may simply be a metering name or may include a new or replacement metering category. The metering information can include other information such as an indication that the subscribers account is to be charged based on some other metering data already associated with the data inspection logic or associated with metering data 34.

The content server 40 has HTTP logic 44 for providing a reply to the MSDS 10. Preferably the metering information supplied by the content server 40 to the MSDS 10, with the subscribers reply, is provided in a HTTP header of a response message to the subscriber (directed through the MSDS 10). The content server 40 includes HTTP logic 44 for adding an HTTP extension header, as part of the HTTP header of the response message. The HTTP extension is provided as an additional line as part of the HTTP header.

The metering information can include a content value class for post paid subscribers and/or a credit amount for prepaid subscribers, each applicable to the content to be transferred. The metering information may also be presented as part of a header of a different protocol. Further, the metering information may be provided in the body of the response (such as for Multimedia Messaging System (MMS) applications). In such a case, the inspection logic 30 must parse the entire message to consider the metering information. In the preferred embodiment, the metering information is in an HTTP header.

Upon receiving the new reply from the content server 40, the inspection logic 30 inspects the HTTP header. If the metering information provides an indication of the amount to be charged to the subscriber's accounts, the inspection logic 30 proceeds to make the charge and the reply is passed through to the subscriber 7. If the metering information provides a metering category 37 or other information associated with MSDS 10, the inspection logic 30 refers to the metering data 34 and applies the charge to the subscribers account based on the appropriate metering category of metering categories 37 or some other metering data of metering data 34. The delivery system in applying appropriate charging to the subscribers account may base the charging on the content value class for postpaid subscribers and/or the credit amount for prepaid subscribers applicable to the content to be transferred and may generate a Call Detail Records (CDRs) for auditing and settling up with the business partner As indicated above, the system of the invention can be provided wherein the metering information is sent without the use of HTTP or where the metering information is sent in the body of the response. This can be practiced particularly with the case of a MMS message, wherein the body of the message is in any event parsed by the inspection logic 30. However, for many applications, use of the HTTP header provides advantages.

Figure 3:
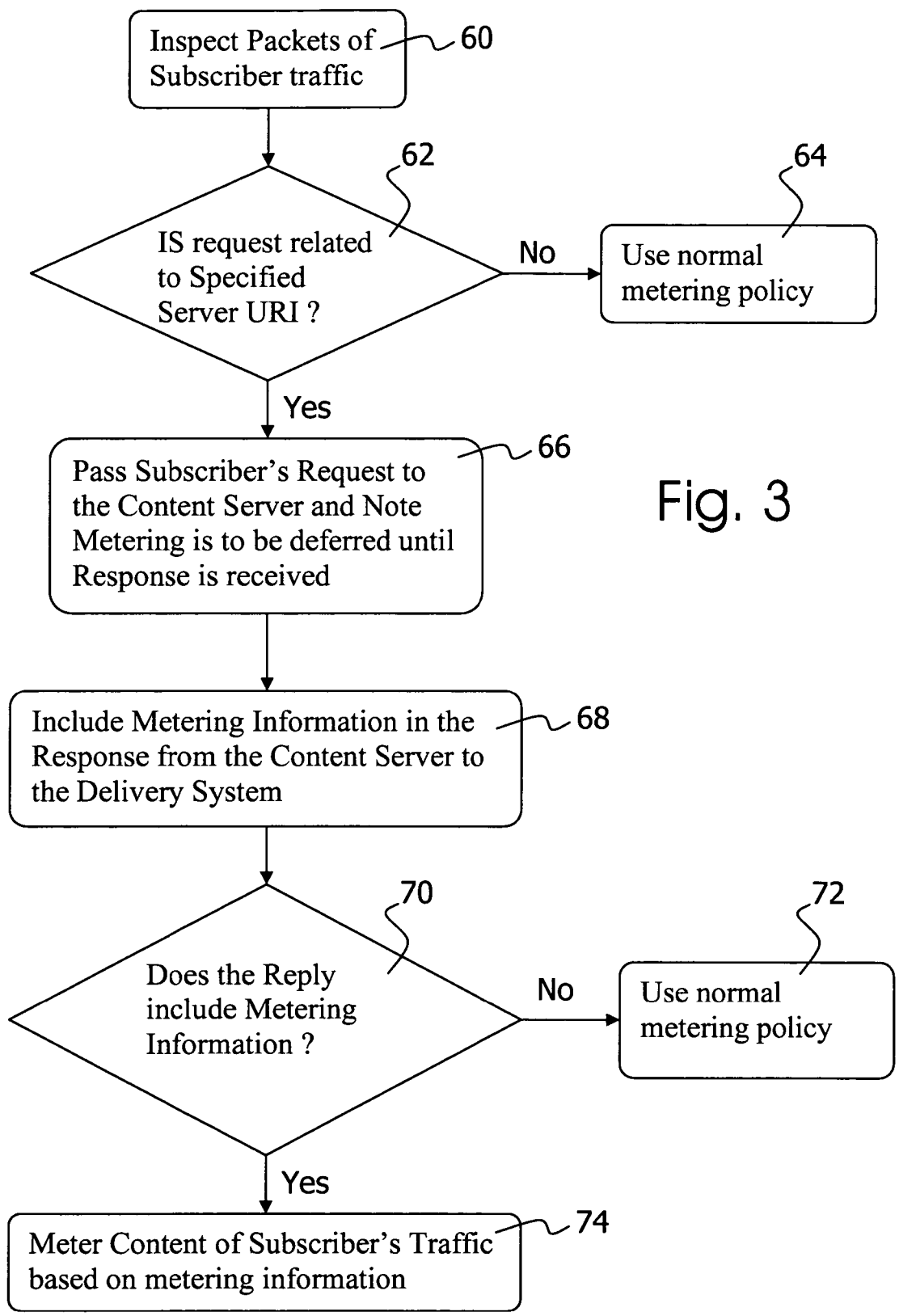
FIG. 3 is a flow diagram showing basic features of the process of the invention.

FIG. 3 shows basic steps according to the method of the invention. In step 60, the system inspection logic 30 inspects packets of a subscriber traffic packet flow. In step 62, the system inspection logic 30 determines whether a subscriber request of the traffic packet flow 28 relates to a server or server specified in the metering data 34. If the request does not relate to a server specified in metering data 34, the system inspection logic 30 applies a normal metering policy as indicated in step 64. If the request does relate to a server specified in metering data 34, the system inspection logic 30 passes the subscriber's request through to the specified content server 40 and notes metering is to be deferred until response is received as indicated in step 66.

In step 68, each content server 40 includes metering information in the response from the content server to the subscriber 7 through a delivery system to the MSDS 10. In step 70, upon receiving the new reply from the content server 40, the inspection logic 30 inspects the reply to see whether it includes metering information. If the reply does not include metering information, the inspection logic 30 uses a normal metering policy as indicated in Step 72. If the reply includes meter information, the system logic 30 applies charges as to the content of subscriber's traffic based on metering information to determine the valuation of a traffic application as indicated in Step 74.

It should be noted that the normal metering policies applied by the subscriber delivery system described above may include pre-rating tables and pre-paid balance management protocols such as, Remote Authentication Dial in User Service (RADIUS), DIAMETER and Open Service Architecture (OSA)/PARLAY.

While specific embodiments of the invention have been shown and described in detail to illustrate the application of the principles of the invention, it will be understood that the invention may be embodied otherwise without departing from such principles.

What is claimed is:

1. A system, comprising:
    a data inspection logic to inspect subscriber packet traffic to receive and inspect subscriber requests included in the subscriber packet traffic, to determine if a request relates to a content server or the server's content, and if a subscriber's request relates to a content server or the server's content, the data inspection logic to pass the request to the specified content server; and
    wherein said data inspection logic to receive a reply from the specified content server in response to the request, the specified content server's reply to the request includes a reply header and metering information provided by the content server in an extended portion of the reply header, and said data inspection logic adapted to apply appropriate charging to a subscriber's account based at least in part on said metering information provided by the content server in the extended portion of the reply header.

2. The system of claim 1, further comprising memory coupled to the data inspection logic and having stored therein metering data, and said data inspection logic adapted to said determine by determining if a request relates to a content server or the server's content specified in said metering data.

3. The system according to claim 2, wherein said content server supplied metering information comprises one or more of:
    a name of a metering category, wherein said metering data includes a plurality of metering category data associated with said data inspection logic, each of said metering category data having associated charging information;
    information providing an indication of the amount to be charged to the subscriber's account;
    a content value class for postpaid subscribers and/or a credit amount for prepaid subscribers applicable to content to be transferred; and
    information providing an indication that a subscriber's account is to be charged based on metering data already included in the memory.

4. The system according to claim 2, wherein said memory further comprising metering category data, each of said categories having associated charging information, wherein said content server supplied metering information comprises a name of a metering category or a new or replacement metering category and said charging to the subscriber's account is based on a metering category already included in the memory or based on the new or replacement metering category.

5. The system according to claim 2, wherein the metering data includes one or more Uniform Resource Identifier (URI) sets comprising collections of patterns which can match an URI used in the subscriber's request, and the data inspection logic adapted to determine if the subscriber's request relates to a content server or the server's content specified in said metering data based at least in part on the URI sets and if so, to pass the subscriber's request through to the specified content server.

6. The system according to claim 2, wherein if the subscriber sends a request for content of the specified content server, said inspection logic is adapted to hold or save data provided in the request that indicates the request is server specified metering, until a response is received from the specified content server, and where the request relates to a content server or the server's content specified in said metering data and the reply does not include content server supplied metering information or where the request does not relate to a content server or the server's content specified in said metering data said inspection logic applies a normal metering policy.

7. The system according to claim 6, wherein said normal metering policy includes using one or more of pre-rating tables and one or more prepaid balance management protocols including a protocol selected from the group consisting of Remote Authentication Dial in User Service (RADIUS), DIAMETER and Open Services Architecture (OSA)/PARLAY.

8. The system according to claim 1, wherein said data inspection logic is further adapted to defer metering at least until a reply is received from a content server in response to the request.

9. The system according to claim 1, wherein said content server supplied metering information is provided in a body of a response message to a subscriber, and said data inspection logic adapted to parse said body of said response message, wherein said response message is a Multimedia Messaging System (MMS) message.

10. The system according to claim 1, wherein the system is adapted to apply appropriate charging to the subscriber's account based on a content value class for postpaid subscribers and/or a credit amount for prepaid subscribers applicable to the content to be transferred.

11. A method, comprising:
receiving subscriber packet traffic at a subscriber delivery system, the subscriber packet traffic including requests for content from a content server, and the subscriber delivery system including data inspection logic;
the data inspection logic inspecting the subscriber packet traffic including receiving and inspecting subscriber requests to determine if a request relates to a content server or not, and if the request relates to a content server, passing the request to the content server;
receiving at the subscriber delivery system a reply from the content server in response to the request, the reply including a reply header and metering information provided by the content server in an extended portion of the reply header; and
upon receiving the reply, the inspection logic determining if the reply can be passed to the subscriber based at least in part on the metering information provided by the content server in the extended portion of the reply header, and if so, appropriately charging to a subscriber's account based at least in part on the metering information provided by the content server in the extended portion of the reply header.

12. The method according to claim 11, wherein the data inspection logic defers metering until a reply is received from the content server.

13. The method according to claim 11, wherein the content server supplied metering information includes one or more of:

a content value class for postpaid subscribers and/or a credit amount for prepaid subscribers applicable to the content to be transferred;
information comprising information providing an indication of the amount to be charged to the subscriber's account;
information comprising information providing an indication that the subscriber's account is to be charged based on metering data already stored in a memory coupled to the data inspection logic; and
a name of a metering category stored in a memory coupled to the data inspection logic, the metering category having associated charging information.

14. The method according to claim 13, further comprising the subscriber delivery system applying appropriate charging to the subscriber's account based on the content value class for postpaid subscribers and/or the credit amount for prepaid subscribers applicable to the content to be transferred.

15. The method according to claim 11, wherein the subscriber delivery system is coupled to a memory storing metering data, the metering data includes one or more Uniform Resource Identifier (URI) sets comprising collections of patterns, and the data inspection logic matching an URI used in the subscriber's request to determine if the subscriber's request relates to a content server or the server's content specified in said metering data based at least in part on the URI sets and if so, to pass the subscriber's request through to the specified content server.

16. The method according to claim 11, wherein the content server supplied metering information includes a new or replacement metering category providing an indication that the subscriber's account is to be charged based on the new or replacement metering category.

17. A server, comprising:
content to be provided to subscribers; and
logic coupled to the content and adapted to send a reply to a subscriber delivery system, the reply including content and associated metering information to be sent to the subscriber delivery system in response to a request for the content from a subscriber and passed from the subscriber delivery system to the server, the metering information including at least an indication of the amount to be charged to the subscriber's account by the subscriber delivery system when the subscriber is provided with the content by the subscriber delivery system;
wherein said logic is further adapted to send said reply using a messaging protocol that employs extendable message headers, and to include the associated metering information in an extended portion of at least one extended message header.

18. The server according to claim 17, wherein the associated metering information comprises one or more of:
a name of a metering category, wherein said metering data includes a plurality of metering category data, each of said metering category data having associated charging information;
a content value class for postpaid subscribers and/or a credit amount for prepaid subscribers applicable to content to be transferred; and
information providing an indication that a subscriber's account is to be charged based on metering data already included in the subscriber delivery system.

* * * * *